US006957147B2

(12) United States Patent
Baliguet et al.

(10) Patent No.: US 6,957,147 B2
(45) Date of Patent: Oct. 18, 2005

(54) DATA MANAGEMENT FOR SEISMIC ACQUISITION USING VARIABLE COMPRESSION RATIO AS A FUNCTION OF BACKGROUND NOISE

(75) Inventors: Pierre Baliguet, Nantes (FR); Loring Chien, Katy, TX (US); Patrick Cook, Skiatook, OK (US)

(73) Assignee: Sercel, Inc., Houston, TX (US)

( * ) Notice: Subject to any disclaimer, the term of this patent is extended or adjusted under 35 U.S.C. 154(b) by 654 days.

(21) Appl. No.: 10/095,799

(22) Filed: Mar. 12, 2002

(65) Prior Publication Data

US 2003/0176974 A1   Sep. 18, 2003

(51) Int. Cl.[7] ............................................. G06F 19/00
(52) U.S. Cl. ............................ 702/17; 702/1; 708/203
(58) Field of Search .............................. 702/17, 32, 14, 702/1, 2, 3; 367/78; 324/303; 340/853.9; 382/232; 708/203

(56) References Cited

U.S. PATENT DOCUMENTS

| | | | | |
|---|---|---|---|---|
| 4,583,206 A | * | 4/1986 | Rialan et al. ................. | 367/78 |
| 5,157,392 A | * | 10/1992 | Zimmer .................... | 340/853.9 |
| 5,381,092 A | * | 1/1995 | Freedman ................... | 324/303 |
| 5,745,392 A | | 4/1998 | Ergas et al. ................ | 708/203 |
| 6,070,129 A | * | 5/2000 | Grouffal et al. ............. | 702/32 |
| 6,104,982 A | * | 8/2000 | Vermeer ..................... | 702/14 |
| 6,594,394 B1 | * | 7/2003 | Stromberg et al. .......... | 382/232 |
| 2003/0176974 A1 | * | 9/2003 | Baliguet et al. .............. | 702/14 |

OTHER PUBLICATIONS

Lliescu et al., Wavelet Transform Filtering Of Seismic Data By Semblance Weighting, Dec. 2000, CREWS Research Report, vol. 12, All pp. 1-28.*
Donoho et al., Diagnostic Procedures For Safe Seismic Data Compression, EAGE 62nd Conference and Technical Exhibition—Glasgow, Scotland, May 29-Jun. 2, 2000.
Hongsheng et al: Real-time Seismic Wave Data compression Methods; Institute of Electrical Engineers; ACTA Seismologica Sinica, Feb. 1989; vol. 11, No. 1, pp 68-80.

* cited by examiner

*Primary Examiner*—Andrew H. Hirshfeld
*Assistant Examiner*—Victor J. Taylor
(74) *Attorney, Agent, or Firm*—Law Office of Tim Cook P.C.

(57) ABSTRACT

A seismic data acquisition unit includes a data acquisition and digital circuit which receives an analog seismic signal and digitizes the signal. The digitized seismic data uses data telemetry and a repeater device to receive the compressed data and transmit the compressed data to a seismic central control unit. The data decompressor takes the data from the data compressor and decompresses the data. The decompressed data is then compared with the original digitized data to determine the amount of noise resulting from the compression process. The compression noise is compared to the ambient noise, and if the compression noise exceeds a predefined criterion, then the compression ratio in the data compressor is adjusted for a lower degree of compression. The process is repeated until the amount of compression noise, relative to ambient noise, is satisfactory.

30 Claims, 3 Drawing Sheets

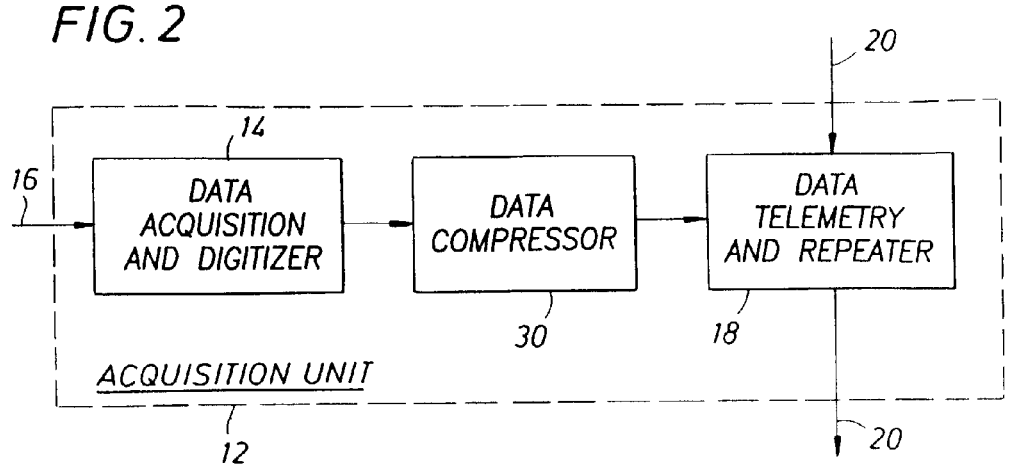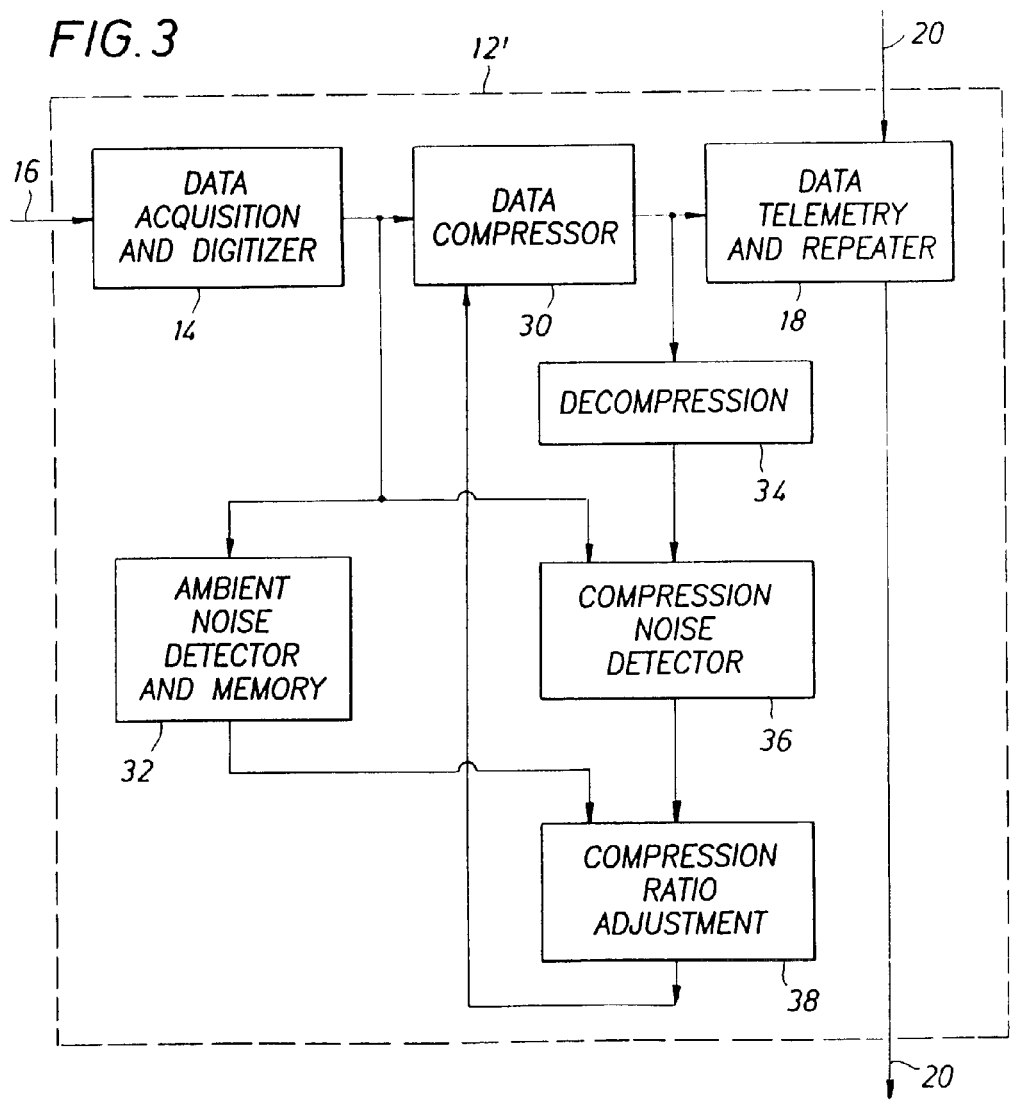

DATA MANAGEMENT FOR SEISMIC ACQUISITION USING VARIABLE COMPRESSION RATIO AS A FUNCTION OF BACKGROUND NOISE

FIELD OF THE INVENTION

The present invention relates generally to the field of seismic exploration and, more particularly, to a system and method of acquiring seismic data in a land system, compressing the data, and transmitting the data to a central receiving station.

BACKGROUND OF THE INVENTION

Modern seismic techniques include the use of data acquisition devices spaced apart at regular intervals over a distance, typically several kilometers. The data acquisition devices collect seismic signals picked up by one or more appropriate receivers (hydrophones or geophones) in response to vibrations transmitted into the ground by a seismic source and reflected back by the discontinuities of the subsoil. The signals which the receivers collect are sampled, digitized, and stored in a memory before transmission of the data to a central control and recording facility or station.

The data acquisition devices may be connected to the central control and recording station by common cables or other means adapted for transmitting both control and test signals and the accumulated seismic data. The various data acquisition devices are interrogated in sequence by the central station and in response the data acquisition devices transmit accumulated data to the central station.

Such a system is described for example in the U.S. Pat. No. 4,398,271. The different acquisition devices may be connected to the central station by a short-wave link. Each of them is then associated with radio equipment. The collected data may be transmitted to the central station in real time and simultaneously for all the acquisition devices. This requires the use and therefore the availability of a large number of wide or narrow band short-wave transmission channels of different frequencies.

Transmission of the data collected by the acquisition devices may also be made sequentially, each of them transmitting in turn its own data either directly to the central laboratory or through other intermediate acquisition devices or relay elements. Recording means are then used for storing the collected data for the time required for their sequential transfer to the central station. Short wave link seismic data transmission systems are described for example in the U.S. Pat. No. 4,583,206.

As new methods of interpreting three dimensional seismic data increase in popularity, the management of ever-larger data volumes becomes critical compared with acquisition and processing. However, the interpretation and use of seismic data requires faster and non-sequential, random access to large data volumes. In addition, quantitative interpretations lead to an increasing need for full 32-bit resolution of amplitudes, rather than the 8 or 16 bit representations that have been used in most current interpretation systems.

Seismic data compression can be a significant tool in managing these data, but "lossy" data compression techniques by definition introduce errors in the recovered or reconstituted images. In fact, several problems regarding image definition arise when using lossy wavelet-transform data compression algorithms currently available. Yet wavelet compression introduces less noise than currently accepted truncation compression. Compressing small blocks of data needed for random access leads to artifacts in the data, and such artifacts must be eliminated for maximum utility in the data acquisition and interpretation system.

Applications of wavelet-transform-based data compression in areas of seismic acquisition, transmission, storage, and processing have been proposed over the past several years. Most of such applications have been concerned with establishing the validity of lossy compression algorithms, particularly when seismic processing is to be carried out on previously compressed data. Most of these applications have been devoted to pre-stack data sets, where the data volume has been so large that the benefits of data compression would be most important. It is now becoming accepted that wavelet-transform or similar noisy data compression algorithms can be very useful in most of these applications, if careful analysis of the effects of compression noise is carried out. Diagnostic standards are currently being developed to permit the use of compression in many areas with fill confidence that compression noise will not degrade data quality in any significant manner.

While these concepts may seem theoretical in nature, they become increasingly significant when applied to operational systems for the acquisition of seismic data. In a typical modern seismic acquisition system, whether land, marine, or transition zone, a number of acquisition units are distributed over the area of interest, as previously described. Each acquisition unit is attached to one or more sensors. Each acquisition unit is capable of measuring the sensor signals over a period of time called a record, and sampling the measurements to create a data record. The record is coordinated between the central control and recording facility or station, which may be referred to in this disclosure as a central unit, to occur in synchronism with the activation of an energy source. The resulting subterranean echoes are the desired seismic data. The acquisition units then use their built-in telemetry capabilities to transmit the data some time afterwards to the central unit. The central unit may send the data to any combination of archival tapes, local pre-processing systems, or via some satellite telemetry to a remote office.

For state of the art distributed digital seismic data telemetric systems, telemetry bandwidth is traded off for total number of channels, distance between repeaters, total length of the system, power consumption, equipment weight, total data throughput, and data reliability. Each of these factors in turn determines the efficiency and cost of a seismic survey. For example, higher bandwidth increases the total number of channels which may be transmitted in the given length of time between seismic shots, or records. Higher bandwidth increases the number of channels able which may be carried on a line segment of the system.

On the other hand, higher bandwidth typically decreases the distance allowed between repeaters, thus requiring more repeaters in the system. Higher bandwidth also generally increases the power required for the repeater, besides having to power more of them. Greater power consumption requires larger and heavier power sources or wire gauges making the equipment less efficient to operate. This factor also affects the distances between repeaters and power sources. Further, replacing or recharging batteries or power sources because of the increased power demand increases service effort and therefore costs.

Aside from considerations of demands on the system structure, higher bandwidth increases the number and frequency of errors introduced in the seismic data, and therefore the computational load and additional bandwidth overhead for detection and correction of such errors. Reducing bandwidth requirements, while not compromising the useful information content of the data, would make seismic surveys less costly. One way to reduce bandwidth requirements is to use data compression.

Data compression reduces the total amount of data required to convey the same information. It is well known in the art of digital data processing that there are a number of schemes for both lossless and lossy data compression. A data block, such as a file, may be run through a process of compression to reduce it to a smaller block for storage or transmission. A reverse process, decompression, will return the data block to its original form so that it may be manipulated. Lossless compression assures that the digital data recovered is an exact representation of the original data, but is limited in data reduction ability. This kind of data is used for data files in which no bits may be changed or the exact meaning may be lost, such as computer programs, financial records, word processing, and other similar applications. Lossy data compression, on the other hand, yields much greater reduction of data in the compressed state, but the recovered data will not be an exact representation of the original. This is useful for data whose ultimate destination is to be an analog of a graphical representation such as sound or visual recordings, where keeping key audible or visible features retains the important audio or visual content. Seismic data falls into this category.

With lossy compression, a special parameter enters into the compression process. This parameter is called "Q", a threshold and scaling factor used in lossy compression. This parameter, Q, is related to the compression factor, or compression ratio (how much the original data volume is reduced) and the amount of data loss. Increasing Q increases the compression ratio. For systems which use lossy data compression, the compression ratio determines that amount of error, i.e. noise, introduced in the compression/decompression process. Increasing the compression ratio also increases compression noise. Further, as previously mentioned, introduction of ambient noise in certain data acquisition and transmission systems is a fact of life. What is important is that the noise introduced in the compression process, or compression noise, be sufficiently small relative to the ambient noise, over which there is little or no control. Alternatively, the noise must be kept much smaller than the signals which are of principal interest in the system.

Thus, there yet remains a need for an efficient, implementable data compression system in a seismic data acquisition system in which compression noise may be varied or tuned so that compression noise is small in relation to ambient noise, and/or much smaller than the signals of principal interest.

SUMMARY OF THE INVENTION

The present invention addresses this need in the art by providing a tunable data compression unit within a data acquisition unit. The data acquisition unit comprises a data acquisition and digitizer component which receives an analog seismic signal and digitizes the signal. The data acquisition and digitizer component also acquires an ambient noise signal at some point in the data acquisition and recording cycle at a time when ambient noise is not masked by the seismic signal. The data acquisition unit further comprises a data compressor to receive the digitized signal from the data acquisition and digitizer component and compress the digitized data, preferably with a lossy compression algorithm. Finally, the data acquisition unit includes a data telemetry and repeater device to receive the compressed data and transmit the compressed data to a central unit.

In a preferred embodiment, the data acquisition unit includes a data decompressor. The data decompressor takes the data from the data compressor and decompresses the data. the decompressed data is then compared with the original digitized data to determine the amount of noise which resulted from the compression process. The compression noise is compared to the ambient noise, and if the compression noise exceeds a predefined criterion, then the Q in the data compressor is adjusted for a lower degree of compression. The process is repeated until the amount of compression noise, relative to ambient noise, is satisfactory. As used herein, the term "predefined criterion" when applied to compression noise, refers to any of a number of predetermined objective measures, such as the absolute ratio of compression noise to ambient noise, an absolute measure of compression noise such as in microvolts, the signal to noise ratio, the absolute compression ratio, and the like.

These and other features of the invention will be apparent to those skilled in the art of seismic data acquisition from a review of the following detailed description along with the accompanying drawings.

BRIEF DESCRIPTION OF THE DRAWINGS

FIG. 2 is a schematic block diagram of a seismic acquisition unit of the present invention with data compression.

FIG. 3 is a schematic block diagram of the preferred embodiment of a seismic acquisition unit including variable compression ratio as a function of background noise.

DETAILED DESCRIPTION OF A PREFERRED EMBODIMENT

Figure 1:
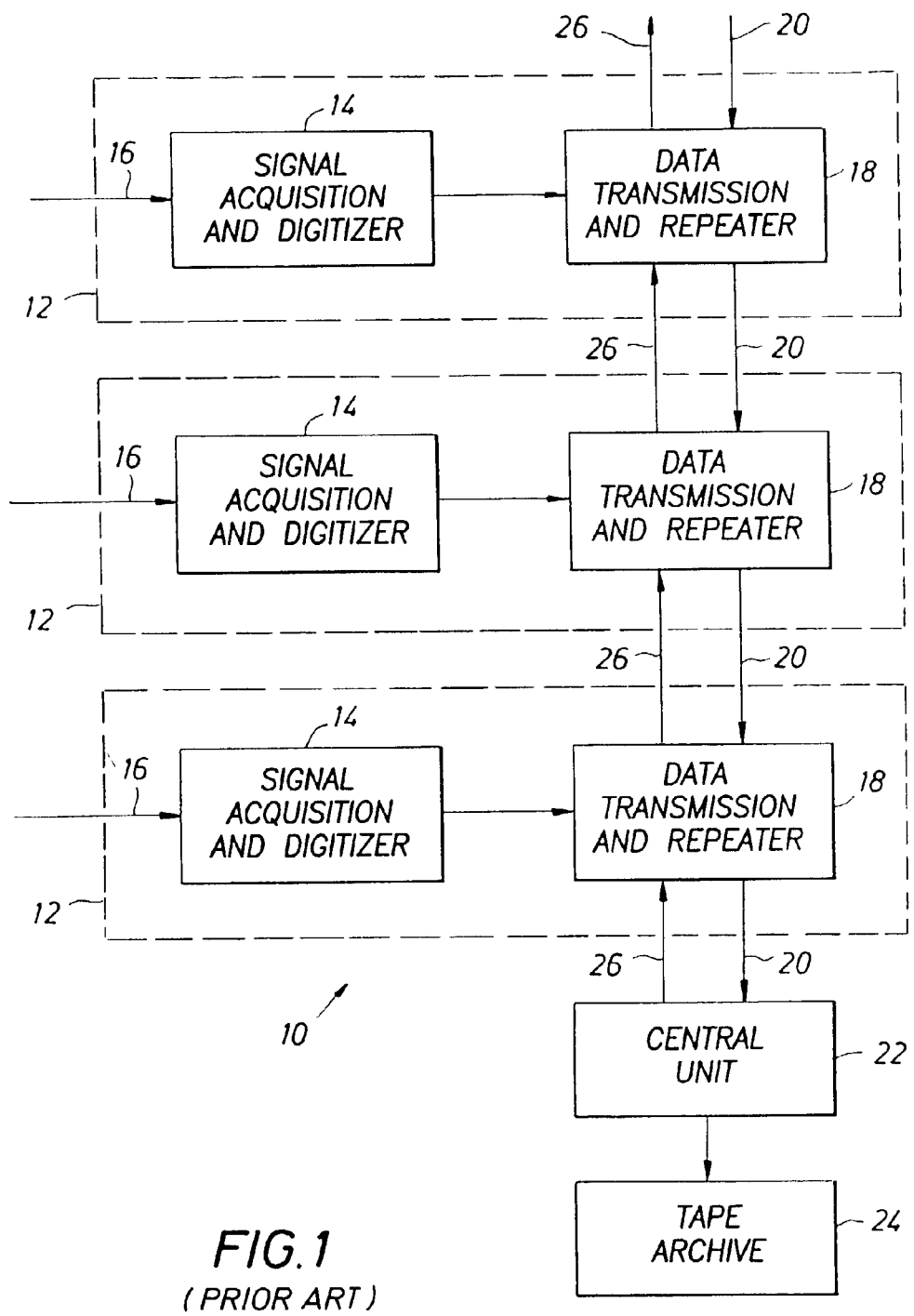
FIG. 1 is a schematic block diagram of a typical seismic acquisition system.

FIG. 1 illustrates a typical seismic acquisition system 10. In such a typical system, signal acquisition is performed with a plurality of acquisition units 12. The acquisition units 12 are spread over many square kilometers and linked by wired cable or radio telemetry. In the acquisition units 12, A/D converter circuits 14 sample seismic signal data over data acquisition lines 16 from a large number of sensors (not shown).

The digital data from each A/D converter circuit 14 is passed to a data transmission and repeater circuit 18, which sends the data at a given bit rate via a telemetry line 20 to a central unit 22. The telemetry line may be an installed cable or wire, or fiber optics, or by way of a radio signal. Further, the data may be recorded on mass memory devices and then physically retrieved and downloaded onto the central unit 22.

The central unit 22 receives all the data from the various seismic acquisition units 12 and writes the data to a tape archive 24. A command line 26, parallel to the data telemetry path but going outward from the central unit, permits the records and sampling in the acquisition units to be synchronized and allows for acquisition units to be tested and configured as desired.

FIG. 2 depicts an acquisition unit 12' in accordance with the present invention. A data compressor circuit 30, preferably a microprocessor, is added to the acquisition unit between the signal acquisition and digitizer 14 and the data transmission and repeater circuits 18. The data compressor is preferably a lossy data compression processor which takes the digitized data record and reduces its volume.

As previously described, data compression in the art of seismic acquisition is known. However, lossy compression has heretofore not been used extensively in the application of seismic data acquisition systems because the effect of compression could not be properly predicted and, more specifically, could not be guaranteed to not extensively damage the data. Therefore, in order to limit and make the effects of the compression known, the present invention adds a number of functions or processes (which may be implemented in software embodied in a microprocessor or in hardware) as shown in FIG. 3.

In the preferred embodiment of the invention, an ambient noise detector and memory 32 measures the sensor signal from the data acquisition and digitizer 14. If the acoustic signal is monitored continuously, samples of the acoustic signal taken just prior to the beginning of a record will contain just the sensor and environmental noise present. Seismic system environmental noise may consist of wind or wave noise, flow noise over streamers, shipping, vehicular traffic, etc. Alternately, samples taken immediately after the start of the record but before the source energy arrives (so called first-break), may also be construed to be ambient environmental noise. The time available in this case depends upon the distance to the source. The advantage of a first-break measurement is that ambient noise can be measured in response to start of the record instead of continuously or having some pre-start signal required. A third alternative for the timing of the measurement of ambient noise would be to use some samples, say the last 0.5 seconds of the seismic record, as representative of the ambient noise, since the source energy dies down rapidly over time. A fourth alternative would be to continue sampling for an additional period of time, say 0.5 seconds, after the end of the record, and use that data as representative of the ambient noise. Finally, a dummy record may be taken when no energy source shot is being initiated. This last alternative assumes that ambient noise does not change appreciably over the entire period when seismic data is to be developed.

Whenever such ambient noise is acquired, the ambient noise samples may be reduced to a noise figure by means such as RMS averaging, well known in the mathematical and statistical sciences. This ambient noise figure is stored in the ambient noise detector and memory 32 for use in subsequent processing.

A decompression component 34 includes a decompression function identical to the one that will be used in recovering the final data for recording or for use in the seismic processing center or central unit. A compression noise detector 36 takes the record before compression from the data acquisition and digitizer 14, and the record after compression by the data compressor 30 and decompression by the decompression process 36. By differencing the compressed-decompressed data and the original data, the compression noise is calculated. The preferred means of doing this is a sample-by-sample subtraction of the two series, then taking the AC RMS average of the difference series.

For the purposes of seismic data, users must generally deal with noise—particularly the environmental, ambient noise as well as instrument noise which is typically much smaller than the environmental noise. Seismic data processing has long contended with this noise and developed the processes of abating the noise through such means as NMO correction, stacking and filtering, etc., well known to practitioners of seismic processing. Since lossy compression is known to add noise to the signal, it is possible to predict the amount of noise increase attributable to the compression process. By mathematically-founded processes of adding RMS numbers, it is possible to predict, for example, that white-noise one quarter (25%) of the amplitude of background noise will add 3% to the total noise.

Therefore, if the compression noise limit threshold is set at 25% of the ambient noise stored in the ambient noise detector and memory 32, then it can be proven that the total noise level has only been raised 3% by compression. This is an amount unlikely to exceed permissible noise values normally allowed for seismic surveys, if the ambient noise alone does not exceed a permissible value.

Thus, the invention's acquisition unit has a compression ratio adjuster 38. The compression ratio adjuster 38 iteratively adjusts or tunes the Q of the data compressor 30 for the maximum compression ratio that will make the compression noise figure the desired fraction of the memorized ambient noise figure. A properly tuned compression ratio will maximize compression (smaller record, less transmit time) while keeping compression noise to a value that will not adversely affect the total acquisition noise. The preferred embodiment includes a compression/decompression process fast enough that multiple iterations can be performed before transmitting the data. In the event that this is not practical or desirable, an alternate method is to approach the optimal compression ratio more slowly and iterate once per record, using the "optimal" compression ratio determined after record N or record N+1. This assumes that both the ambient noise levels and the data character change slowly and that one or more records with slightly higher noise will be tolerated due to the stacking (averaging) process used for seismic data.

Alternatively, a specified noise threshold in absolute terms (microvolts or microbars) is specified by the end user and the compression ratio is tuned iteratively to achieve the highest compression ratio that does not exceed that noise threshold. In practice, a tolerance (for example 10%) on the noise threshold is used to prevent an excessive number of iterations—so that the iteration process can be stopped when it is close enough to the desired threshold.

There may come a point when it is determined that the achievable compression ratio meeting the signal to noise ratio or absolute noise is too small and therefore no satisfactory compression can be achieved. In that case, the compression ratio is set as 1:1 and no compression takes place and the data is sent uncompressed as in conventional acquisition systems. Means may be provided in a data header to indicate that compression is enabled or disabled. Seismic acquisition systems typically have some sort of data header providing this kind of feedback.

In the preferred embodiment, a compensating decompression function is embedded in the central unit 22, so that the data is in its normal, uncompressed form to be stored on industry standard seismic field archive tapes. It is also possible to store or retransmit the data in its compressed form and provide the decompression process when the data is taken off the archive tapes or received at the next point in order to save storage space or retransmission (e.g. satellite) bandwidth. This will require implementation of the decompression algorithms in normal processing software.

Figure 4:
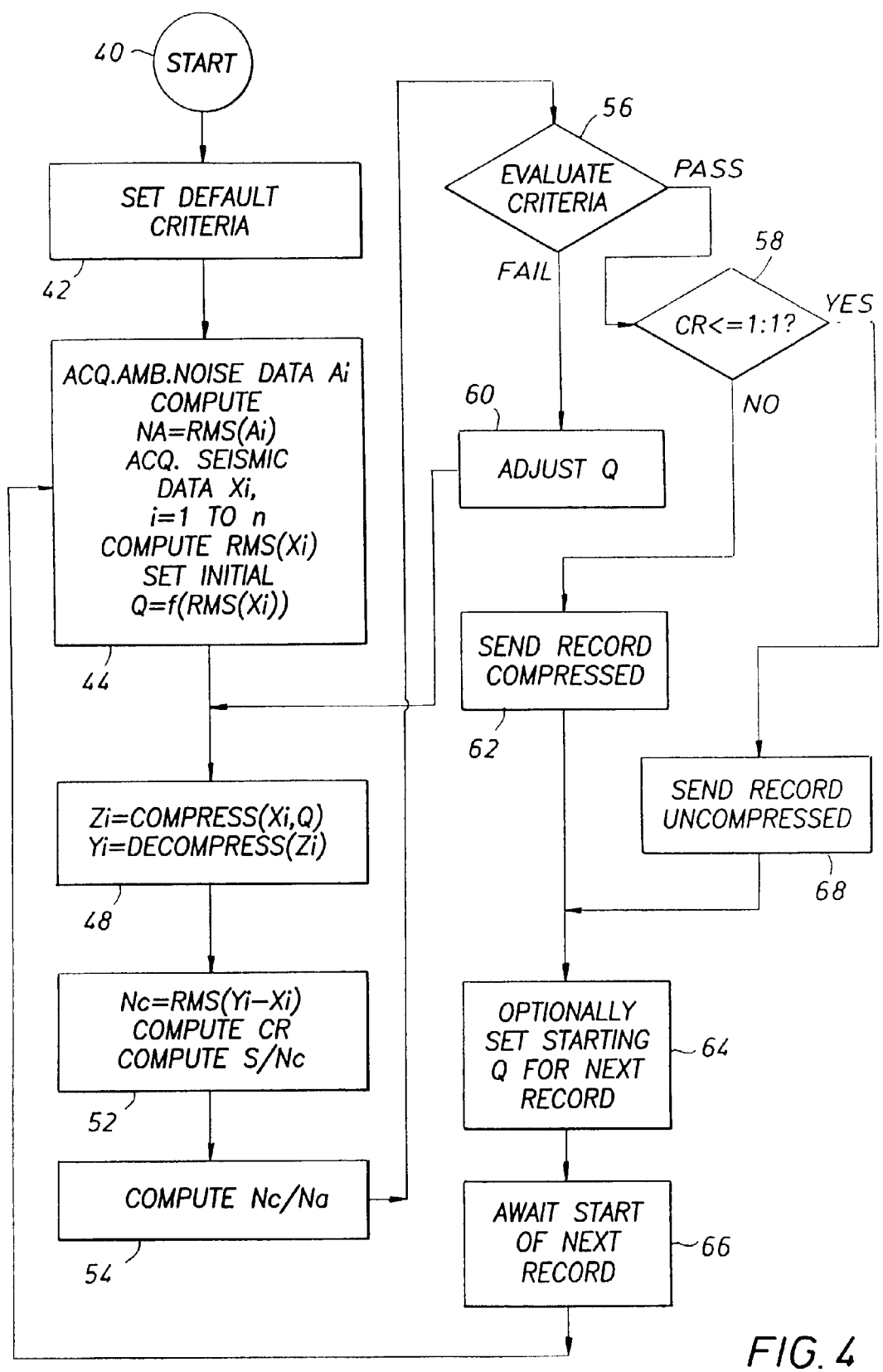
FIG. 4 is a logic flow diagram of the method of this invention carried out by the system depicted in FIG. 3.

The logic flow of the process just described is show diagrammatically in FIG. 4. While the following description of the preferred embodiment is written in terms of software, the present invention may also be embodied in whole or in part in hardware components. The method of the invention begins with a start function in step 40. First, step 42 loads an initial or default set of criteria in the data compressor 30 to initialize the system. Next, in step 44, a data record is acquired by the data acquisition and digitizer component 14. This data record includes acquired ambient noise data ($A_i$), which data are used to compute the RMS value of the ambient noise ($N_a$=RMS($A_i$)). While shown schematically as sequential, the step of acquiring ambient noise level may be conveniently carried out at any point in the cycle where ambient noise will not be masked by the seismic signal, as previously described.

Step 44 also includes acquiring seismic data, shown in FIG. 4 as $X_i$, where i=1 to n. From the collection of data, the RMS value of the data is calculated, shown as RMS($X_i$). The initial value of Q may then be set as a function of the RMS value of the seismic data, Q=f(RMS($X_i$)). As used herein, the term "Q" is defined as a threshold and scaling factor for the compression function. The initial Q is preferably set at some percentage of the RMS value of a trace or of some subset of a trace, for example one second. Alternatively, the initial value of Q may be selected as the value from the immediately preceding record.

In step 48, the data acquired in step 44 is compressed in the data compressor 30 with a compression ratio initially set in step 42. This data compression results in a set of data Zi=COMPRESS($X_i$, Q). This compressed data is then decompressed in the decompression component 34, resulting in a set of data Yi=DECOMPRESS($Z_i$). The level of compression noise, $N_c$, introduced in the data compression step 48, is determined by the compression noise detector 36 in step 52. Also in step 52, the compression ratio, CR, and the signal-to-compression-noise ratio, S/$N_c$, are calculated. In step 54, the ratio of compression noise to ambient noise is calculated. As previously described, rather than a ratio of compression noise to ambient noise, another objective measure of the effect of compression may be calculated in step 54.

Next, in step 56, an evaluation is made as to whether the calculation performed in step 54 meets the criteria for the introduction of compression noise, and the criteria depend on a user selectable target. The purpose of step 56 is to determine if the selected target is met. For example, for a particular application, the user may determine that bandwidth is the critical limiting parameter, and thus may select a specific compression ratio as the target. Alternatively, the user may select other noise-related and compression-related values, such as compression noise ($N_c$), compression noise to ambient noise ratio ($N_c$/Na), signal to compression noise ratio (S/$N_c$), or a combination of these criteria.

If the selected criteria meet the target, then a determination is made in step 58 as to whether the compression ratio is less than or equal to 1. If it is, then the seismic data are transmitted by the data telemetry and repeater unit 18 as an uncompressed record in step 68. If the compression ratio is greater than 1, indicating that some compression has been achieved, then the seismic data are transmitted as a compressed record in step 62. Whether sent as compressed or uncompressed, the data compressor 30 then sets the initial compression ratio target for the next record in step 64, and the system is ready for the next timebreak signal, indicating the start of a new data acquisition cycle. Step 64 may optionally set the starting Q as that of the last data set.

Returning to step 56, if the user selected criteria are not met, then in step 60 the Q is adjusted up or down. If the compression ratio is not too small, then the compression ratio adjustment unit 38 incrementally adjusts the compression ratio in the data compressor 30 and the process continues with the compression/decompression step 48. Preferably, if an increase in compression noise or an increase in compression ratio is required, the Q is increased by a factor which is greater than one and fixed in the initial defaults in step 42. Otherwise, Q is decreased by dividing by the same factor.

It should be recalled that, in order to save time and computation, the determination of satisfactory compression noise may be performed only once per record cycle, and a compression ratio adjustment also made once per cycle. Thus, in summary, the present invention comprises assembling seismic data and ambient noise data, compressing the seismic data (thereby creating compression noise), evaluating the quality of the compressed seismic data in comparison to noise according to a user defined criterion, and, if required, adjusting the compression of the seismic data accordingly. Note that steps 48, 52, 54, 56, and 60 thus define a loop. The system and method just described define the loop in such a way as to adjust Q, which in turn affects compression ratio and compression noise. A higher Q results in higher compression ratio and higher compression noise.

The Q so defined is adjusted in an iterative fashion. The Q may be adjusted to a desired absolute compression ratio necessary to achieve a desired bandwidth reduction, such as for example 20:1 or 15:1, but in this case the noise is uncontrolled. The desired target may be defined by a desired signal-to-compression noise ratio so that the received signal is larger than the introduced compression noise by a used selected factor. Next, the Q may be adjusted to provide a specified, absolute compression noise figure. The compression noise must be smaller than this absolute value, such as for example 4 $\mu$V, that through experience in known to be desirable. Or, the user may determine that the desired target is the ratio of compression noise to ambient noise, for example 25%, so that the compression noise does not contribute substantially to the ambient noise. Finally, another feature of the present invention is a combination of these targets, so that any combination of the previously described targets may be used. For example, the user may determine that the seismic data may be compressed to achieve either signal to compression noise greater than a predetermined value, or the ratio of compression noise to ambient noise less than another predetermined value. This feature provides the advantage on traces that may consists of mostly noise and very little signal, where the signal to compression noise target may be hard to meet.

It should also be noted that with the seismic and noise data in digital form, it is very easy to "sector", or divide in time, the data record. Thus, the Q may be varied depending on the time-wise sectoring of the record, so that one value of Q is used for sectors of the data record where the signal strength is high, and a different value of Q used in other sectors where signal strength is low. This feature of the invention provides the advantage in that the best Q for a given sector may not give the best performance when used on the whole trace because the character of the signal varies with time in the record. For example, very large signals may exist (reflections off shallow layers) in the first two sectors and the seismic data may be masked by noise in other sectors.

The loop previously described may be repeated a selected number of times within the frame of one record. This feature of the invention has the advantage of being able to satisfy the defined criteria every time. The system may also iterate over successive records where one adjustment is made to Q since it may be assumed (subject to verification) that the character of the data does not vary greatly from one record to another. The iterated Q is saved for used on the subsequent record. A record may not meet the criteria on one record bu will achieve it over the next few shots. This is best if computational and time resources are limited and the data must be immediately available for analysis.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art of seismic data acquisition systems and the like without departing from the spirit of the invention.

We claim:

1. A seismic data acquisition system comprising:
   a. a plurality of data acquisition and digitizer circuits to receive analog seismic data from a plurality of seismic sensors and to digitize the seismic data;
   b. a data compressor to receive data from each of the plurality of data acquisition and digitizer circuits and to compress the digitized seismic data;
   c. means to estimate compression generated noise and compression ratio from the data compressor;
   d. means to adjust the amount of data compression in the data compressor from the means to estimate compression generator noise; and
   e. a data telemetry and repeater circuit to receive the compressed data from the data compressor and to transmit the compressed data to a central unit.

2. The seismic data acquisition system of claim 1 wherein the central unit is adapted to decompress the compressed data.

3. The seismic data acquisition system of claim 1, wherein the data compressor is a programmed microprocessor.

4. The seismic data acquisition system of claim 1, further comprising an ambient noise detector to detect ambient signal noise level from the seismic sensors.

5. The seismic data acquisition system of claim 4, wherein the seismic sensors receive seismic data from a source during a seismic recording period and ambient noise during a noise recording period prior to the seismic recording period.

6. The seismic data acquisition system of claim 4, wherein the seismic sensors receive seismic data from a seismic source during a seismic recording period and ambient noise during a noise recording period after the seismic recording period.

7. The seismic data acquisition system of claim 4, wherein the seismic sensors receive seismic data from a seismic source and ambient noise during a recording period.

8. The seismic data acquisition system of claim 1, further comprising a data decompressor for decompressing the data from the data compressor to develop a decompressed signal.

9. The seismic data acquisition system of claim 1, wherein the means to estimate compression generated noise and compression ratio from the data compressor determines the compression noise as a function of the difference between the decompressed signal and the digitized seismic data.

10. The seismic data acquisition system of claim 9 wherein the data acquisition and digitizer circuits measure ambient noise, and further comprising a compression ratio adjustment component to vary the compression ratio of the data compressor to compress the digitized seismic signal with varying amounts of compression until the compression noise is at or below a specified fraction of the measured ambient noise.

11. The seismic data acquisition system of claim 10, wherein the compression ratio of the data compressor is varied one or more times prior to transmitting the compressed data to the central unit.

12. The seismic data acquisition system of claim 10 wherein the compression ratio is varied on successive records to converge on the desired compression ratio.

13. The seismic data acquisition system of claim 9, further comprising means to iteratively compress the digitized seismic signal with varying compression ratios until the compression noise is at or below a user-specified absolute level.

14. The seismic data acquisition system of claim 13, wherein one or more iterations are performed prior to transmitting the compressed data to the central unit.

15. The seismic data acquisition system of claim 13, wherein iteration of the compression ratio is performed on successive records to converge on the desired compression ratio.

16. The seismic data acquisition system of claim 9 further comprising means to iteratively compress the signal with varying compression ratios until the data volume is sufficiently small to transmit in a desired time.

17. The seismic data acquisition system of claim 16 wherein one or more iterations are performed prior to transmitting the compressed data to the central unit.

18. The seismic data acquisition system of claim 16 wherein iterations of the compression ratio are performed on successive records to converge on the desired compression ratio.

19. The seismic data acquisition system of claim 9, further comprising a compression ratio adjustment component to vary the compression ratio of the data compressor to compress the digitized seismic signal with varying amounts of compression until the ratio of seismic signal to compression noise is equal to or greater than a predetermined value.

20. The seismic data acquisition system of claim 9 wherein the data acquisition and digitizer circuits measure ambient noise, and further comprising a compression ratio adjustment component to vary the compression ratio of the data compressor to compress the digitized seismic signal with varying amounts of compression until either compression noise is smaller than a predetermined fraction of ambient noise, or the ratio of seismic signal to compression noise is equal to or greater than a predetermined value, or the compression noise is less than a predetermined absolute value.

21. The seismic data acquisition system of claim 1 wherein the compressed data is transmitted to the central unit over wires.

22. The seismic data acquisition system of claim 1, wherein the compressed data is transmitted to the central unit over fiber optics.

23. The seismic data acquisition system of claim 1, wherein the compressed data is transmitted to the central unit by radio signal.

24. The seismic data acquisition system of claim 1, wherein the compressed data is recorded on a mass memory device and physically retrieved and loaded onto the central unit.

25. The system of claim 1, further comprising means for sectoring the data from each of the plurality of data acquisition and digitizer circuits into time sectors, and wherein the data compressor is adapted to compress data in one time sector by a different compression ratio than the data in another time sector.

26. A method of acquiring seismic data comprising the steps of:
   a. receiving an analog seismic signal in a signal acquisition and digitizing device;

b. digitizing the analog seismic signal in the signal acquisition and digitizing device to develop a digital seismic signal;
c. compressing the digital seismic signal;
d. decompressing the compressed digital seismic signal prior to transmission to estimate the compression noise generated by the step of compression;
e. adjusting the amount of data compression in step c. as a result of the estimation of step d.; and
f. transmitting the compressed digital seismic signal to a central unit.

27. The method of claim 26, further comprising the step of decompressing the compressed digital seismic signal in the central unit.

28. The method of claim 26, wherein the step of compressing the digital seismic signal is performed by a programmed microprocessor.

29. The method of claim 26, further comprising the step of detecting ambient noise level in the signal acquisition and digitizing device.

30. The method of claim 29, further comprising the steps of
a. decompressing the compressed digital seismic signal;
b. determining the amount of noise developed in compressing the digital seismic signal;
c. comparing the ambient noise level to the amount of noise developed in compressing the digital seismic signal; and
d. adjusting the compression ratio in compressing the digital seismic signal until the amount of noise developed in compressing the digital seismic signal is below a predetermined criterion relative to the ambient noise.

* * * * *